INVENTORS
Sherman W. Shaw
Rudolph Alt

INVENTORS
Sherman W. Shaw
Rudolph Alt
BY McCoy, Greene & [signature]
ATTORNEYS

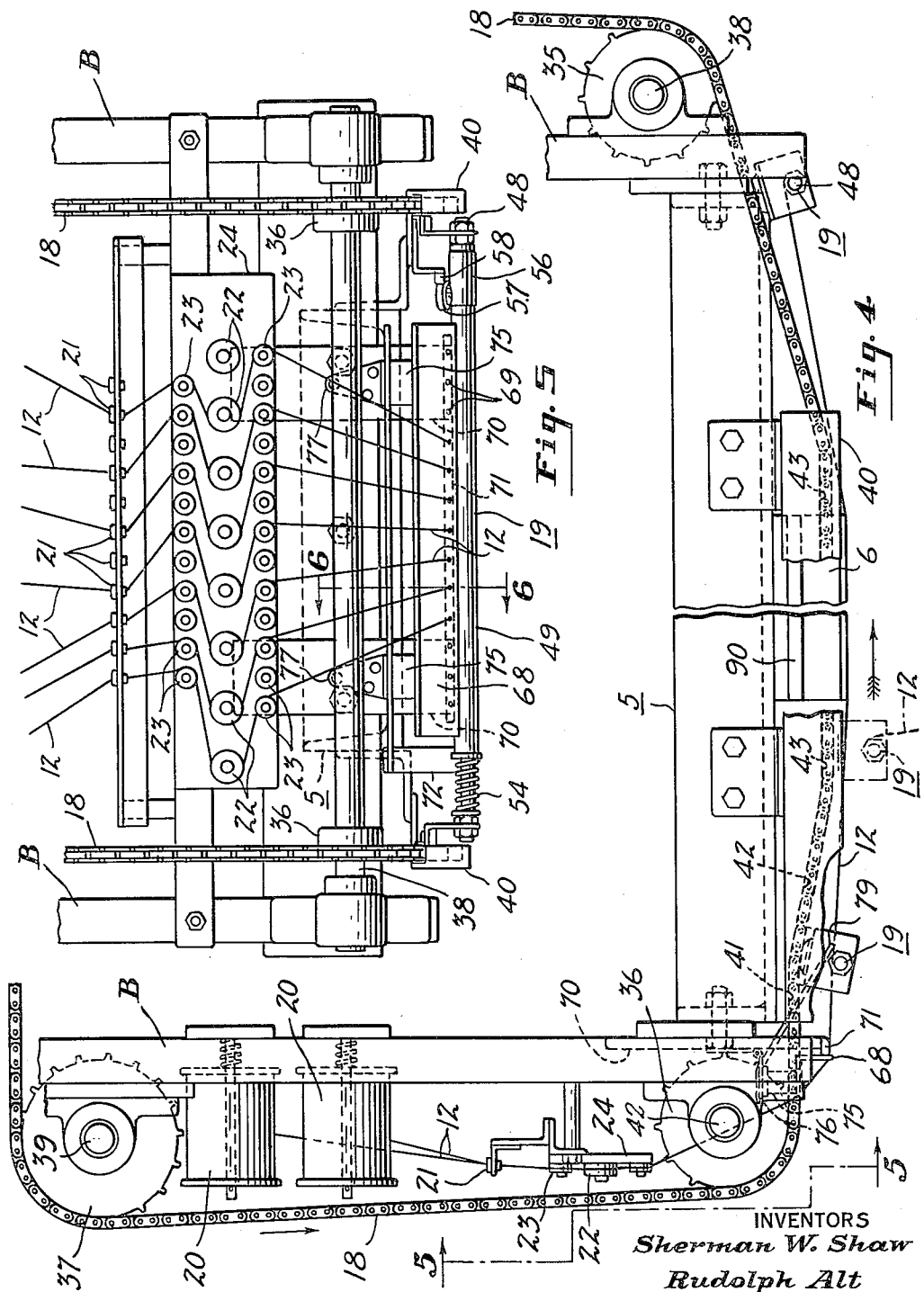

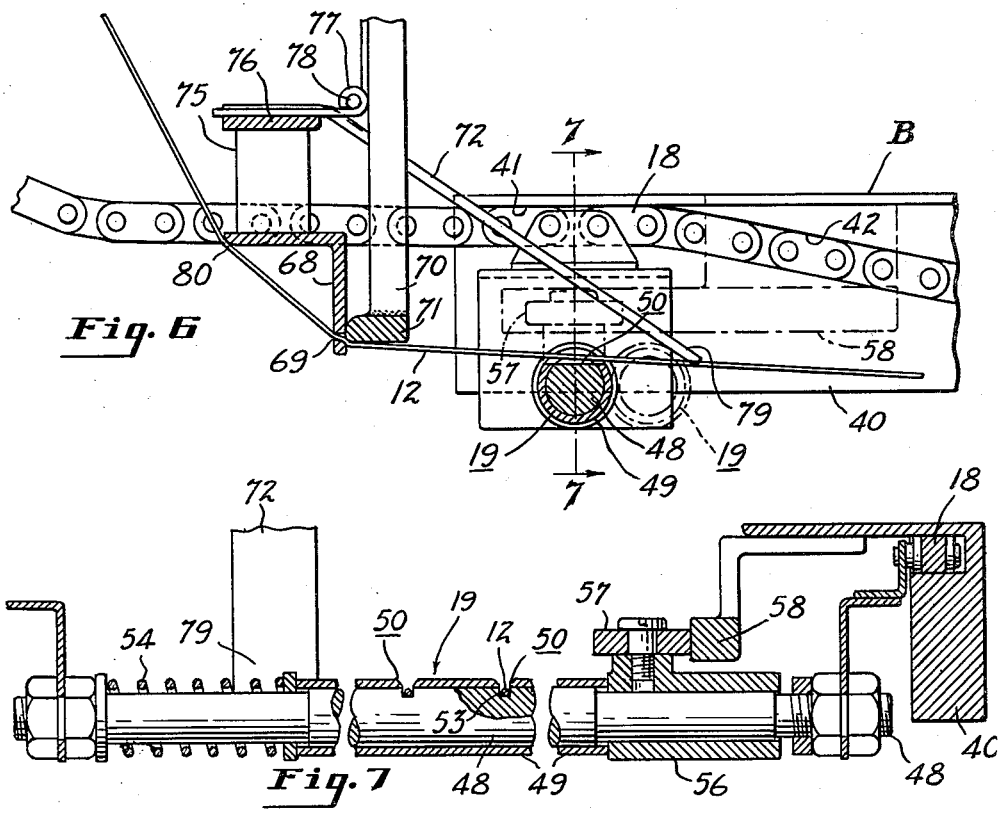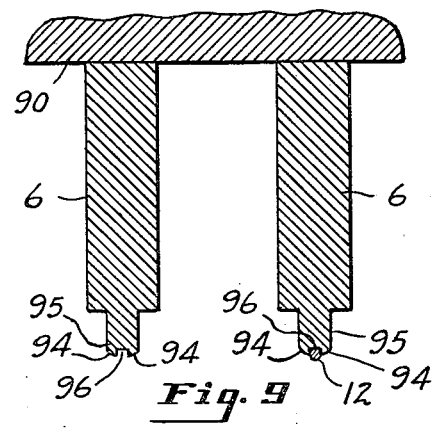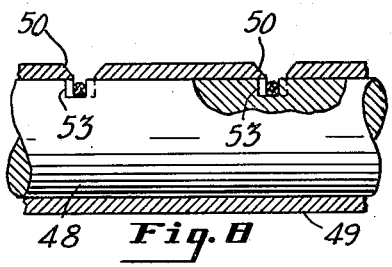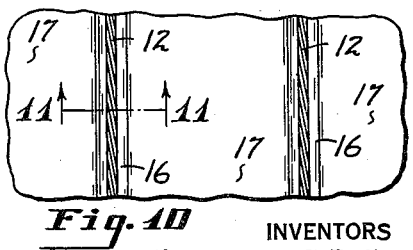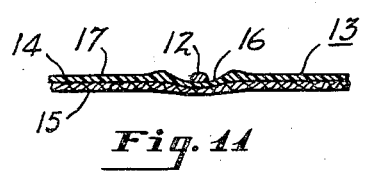
INVENTORS
*Sherman W. Shaw*
*Rudolph Alt*

United States Patent Office 2,994,360
Patented Aug. 1, 1961

2,994,360
METHOD AND APPARATUS FOR FORMING SIMULATED THREADS IN PLASTIC SHEET MATERIAL
Sherman W. Shaw, Stoneham, and Rudolph Alt, Methuen, Mass., assignors to The General Tire & Rubber Company, Akron, Ohio, a corporation of Ohio
Filed May 12, 1958, Ser. No. 734,589
4 Claims. (Cl. 154—1.7)

The present invention relates to an apparatus and method for forming simulated, plastic thread stitching in plastic sheet materials.

It is an object of the present invention to provide an inexpensive, practical apparatus and method for bonding plastic threads to the surface of polyvinyl chloride and other plastic sheeting so as to simulate stitches in the sheeting.

These and other objects will appear as the disclosure proceeds, with reference to the accompanying drawings which illustrate by way of example various aspects of the invention. In the drawings:

FIG. 4 is a sectional view taken along the lines indicated at 4—4 in FIG. 1;

FIG. 5 is a sectional view taken along the lines indicated at 5—5 in FIG. 4;

FIG. 6 is a side sectional view on an enlarged scale of the thread feeding and gripping member and associated parts with certain of the parts shown in phantom lines.

FIG. 7 is a sectional view on an enlarged scale of the thread gripping member;

FIG. 8 is a sectional view on an enlarged scale of the central portion of the thread gripping member;

FIG. 9 is a sectional view of an electrode bar used in an apparatus according to the present invention and shown in an enlarged scale;

FIG. 10 is a fragmentary view of a plastic sheeting having plastic threads bonded thereon in accordance with the present invention; and FIG. 11 is a fragmentary sectional view taken along the lines indicated at 11—11 in FIG. 10.

In accordance with the present invention, plastic thread is bonded to plastic sheeting to form spaced rows of simulated stitching on the surface of the sheeting. The threads are bonded to the sheeting by the action of a plurality of dielectrically-heated electrode bars which are mounted on a movable platen of a press and reciprocate in conjunction with a plurality of thread grippers which pull and position lengths of thread under the bars prior to pressing them into the sheeting. After each downward stroke of the press, the thread grippers move a new length of plastic thread into position over the plastic sheeting and between the sheeting and the electrode bars, so that each time the electrode bar contacts the sheeting, a length of thread is bonded to the plastic sheeting. At the same time lateral movement of the plastic sheeting itself is coordinated with the movement of the electrode bars, and movable platen of the press.

Figure 3:
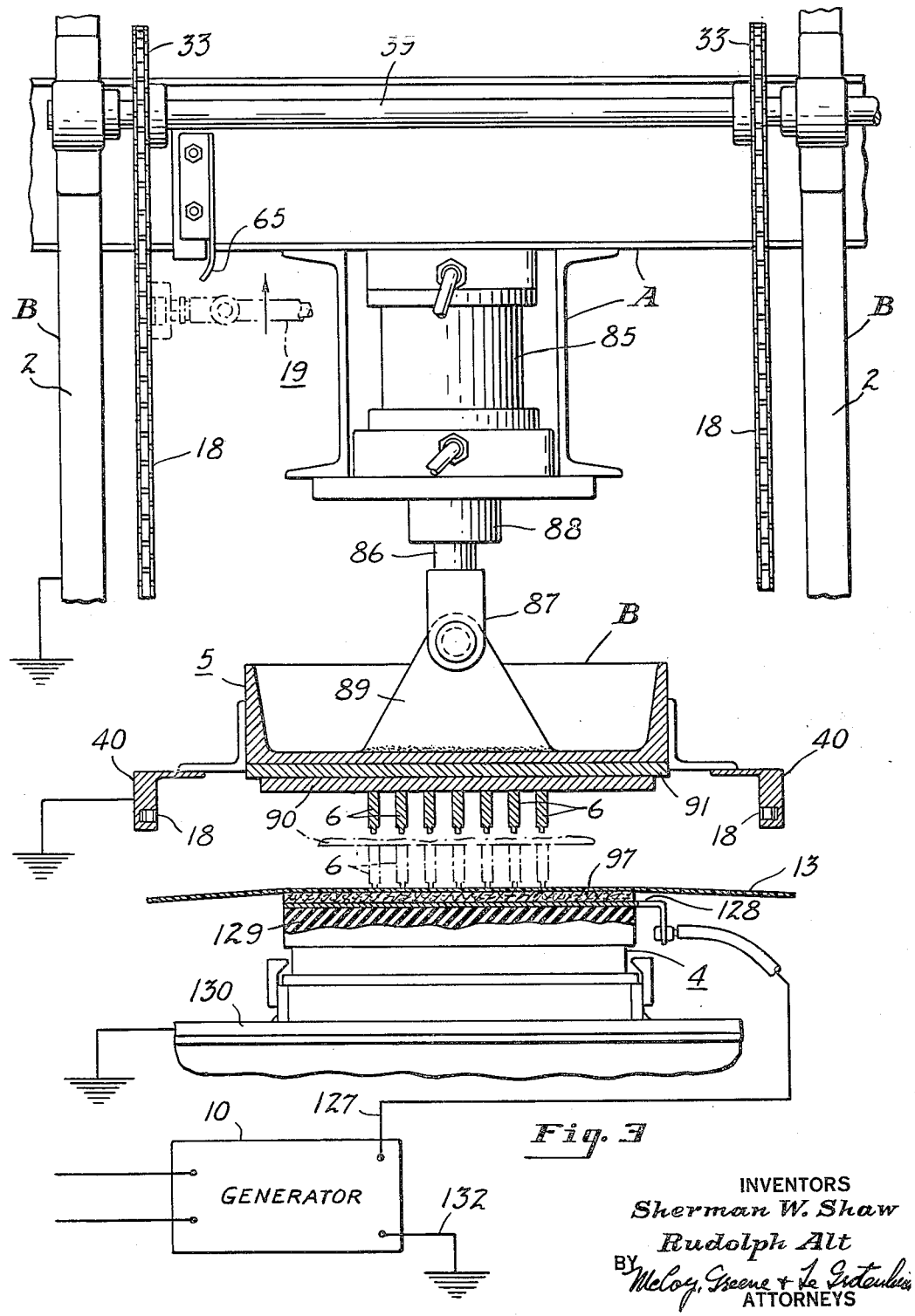
FIG. 3 is a fragmentary sectional view taken along the lines indicated at 3—3 in FIG. 2 with parts shown diagrammatically.

Referring more particularly to the drawings, the press comprises a stationary rectangular, box-like frame A and a movable slide B (FIG. 3). Frame A comprises spaced-apart, upright I-beams 2 and generally horizontal, bracing and supporting beam members 3 which support a base platen 4. The movable slide or frame B is actuated hydraulically by means suspended from frame A and contains a reciprocating platen 5 which has a plurality of electrode bars 6 attached to the underside thereof.

In order to fuse and bond the threads to the plastic materials, the base platen 4 and electrode bars 6 are used as opposing electrodes for a dielectric heating system and are connected to a suitable high frequency generator 10 which can produce a high frequency electrostatic field. The dielectric heating is used to bond plastic thread 12 to a plastic sheeting 13. As best shown in FIG. 11, the sheeting comprises a flexible plastic layer 14, which is preferably a polyvinyl chloride composition, and a suitable backing layer 15. The plastic threads are welded to the layer 14 in a plurality of generally parallel spaced grooves 16 which are preferably several times the thickness of threads to produce a quilt-like appearance.

A pleasing appearance is obtained by the padded or stuffed appearance of portions 17 of plastic sheeting between the grooves 16 where the plastic layer 14 and backing 15 have been definitely pressed together. The thickness of the sheeting in the grooves is much less, say generally only one half as much, as the thickness of portions 17 of the sheeting between the grooves 16. The diameter of the threads 12 before bonding is generally about equal to the thickness of the plastic layer 14. The diameter of the thread should be sufficient so that after the bonding and pressing action at the grooves 16, the overall thickness of thread 12, plastic layer 14 and backing 15 being about the same as the thickness of the plastic sheeting 13 between the grooves 16 where the sheeting has not been compressed or densified. The threads may be single monofilaments or two monofilaments twisted together or other arrangements as desired.

Figure 1:
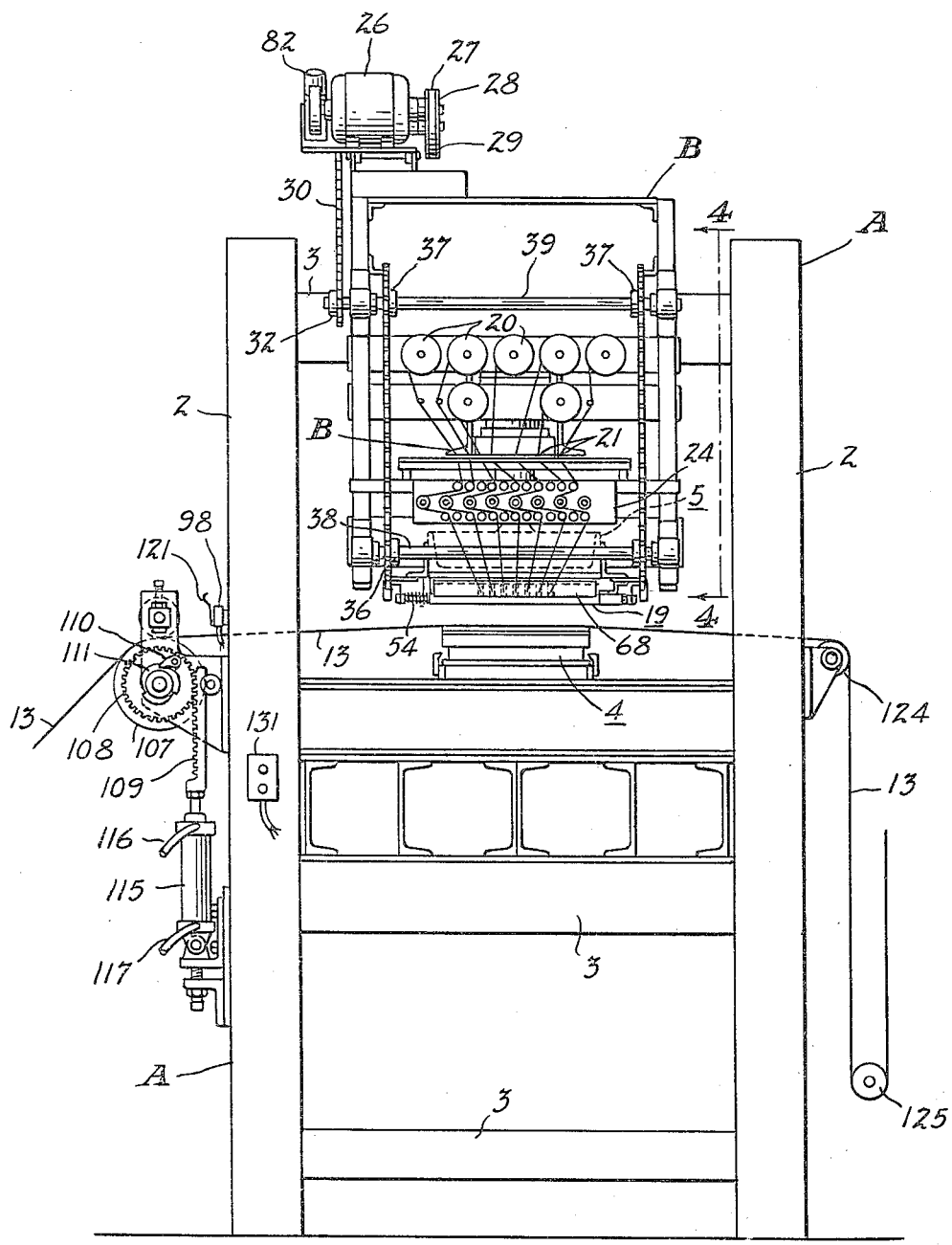
FIGURE 1 is a front elevational view of an apparatus for making a simulated thread stitching on plastic sheeting in accordance with the present invention.
Figure 2:
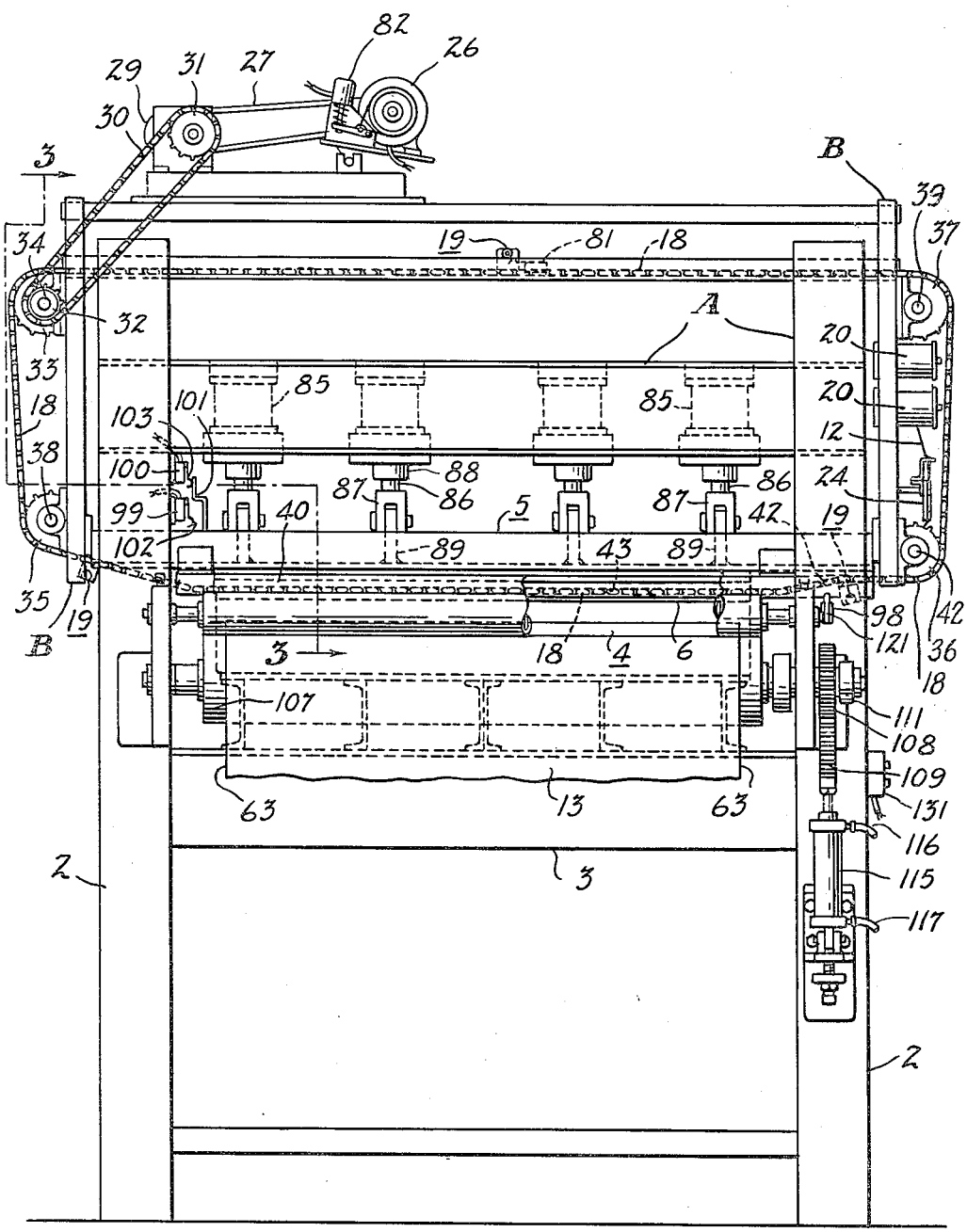
FIG. 2 is a side elevational view of the apparatus of FIG. 1.

Referring to FIG. 1, the cycle is one in which the plastic sheeting 13 is fed into the press across platen 4 from the right and removed on the left. The feeding cycle is an intermittent one in which the sheeting rests on the platen while the threads are bonded or applied to it and then is moved on. Referring to FIG. 2, the threads are placed across the sheet by a thread gripping and positioning mechanism working from an endless conveyor chain 18 which follows a closed substantially rectangular path about the platen 4. A cycle is followed in which the plastic sheeting is positioned on a platen 4, a length of thread is drawn across each electrode bar 6, the movable platen 5 descends on the fixed platen, cuts off the threads, bonds the threads to the sheeting, retracts, and the sheeting is moved on over the platen 4 and positioned for the next operation.

Referring to FIGS. 4 and 5, the plastic thread 12 is fed by a plurality of thread grippers 19 mounted on a pair of conveyor chains 18 guided by sprockets 33, 35, 36 and 37 mounted on frame A. The chain 18 straddles platen 4 and does not interfere with the movable platen B. The threads 12 come from a source of supply or thread supply means comprising storage spools 20, go through thread guides or orifices 21 and tension control means comprising a relatively large diameter idling roll 22 spaced between and off-set from smaller rolls 23 mounted on plate 24. The large roll 22 is offset laterally from the two small rolls to provide a suitable snubbing and tension in the thread. The threads 12 go from the lower tension control roll 23 through orifices 69 in L-shaped member 68 into a slot 52 in shaft 48 (FIG. 6) where it is gripped.

The thread grippers pick up, hold, and move the thread when the roller chains are moved by driving means comprising an electric motor 26 which turns a V-belt 27 on pulleys 28 and 29 which turn chain belt 30 on sprockets 31 and 32. The latter sprocket 32 is keyed to shaft 34 which drives sprocket 33. The chains 18 move around idler sprockets 35, 36 and 37 which are rotatably mounted on shafts 38, 42 and 39, respectively.

Chains 18 are guided in their travel between idler sprockets 35 and 36 by a pair of guide bars 40 which have guide grooves 43 therein through which the chains pass.

Considering the thread gripper members 19 and their function in more detail, each thread gripper, as seen in FIG. 7, comprises a shaft 48 and an outer sleeve 49 having a plurality of horizontally-spaced, crosswise slots 50 cut therein. The thread gripper shaft 48 is also notched to form generally rectangular openings 53. When the thread is being received, the slots 50 and 53 are aligned. When thread is being gripped, the slots are laterally displaced with the result that the thread is held between the edges of the bottom of the sleeve slot 50 and sidewalls of the shaft slot 53. The position of the sleeve 49 along the shaft 48 is determined or fixed by springs 54 which keeps the bottom portion 50 of the sleeve slot pressed against the thread in slot 53. As noted, the thread can be released or picked up when the slots and notches are aligned. This is accomplished by means of a relatively short slidable sleeve portion 56 at the end of sleeves 49 which has a roller or cam follower 57 mounted thereon which engages cam 58 and thereby releases the thread from slot 53. The contact of the roller with the cam 58 exerts force in a direction opposite to that of spring 54. The force opposed to that of the spring 54 moves the sleeve to the right along the longitudinal axis of the shaft 48 so that the bottom portion 50 of the slots are aligned with the notches 53 in the shaft itself.

To follow the path of the thread-gripper members through a cycle, it can be seen in Fig. 2 that there are three thread grippers about equally spaced apart which are attached to the roller chain and which thus follow a path around the movable platen. When a thread gripper is in an upper position over the movable platen and between the sprockets 33 and 37 as noted in FIG. 2 or FIG. 1, the gripper member 19 is not carrying any thread. Also, when the gripper member is in the above position, the bottom portions 52 of the slots are not aligned with notches 53. When the thread gripper member travels in a path around driving sprockets 33 past idlers 35, the roller 57 engages cam 58. The action of the cam aligns the bottom slot portions 50 of the sleeve and the notches 53 of the shaft 48 whereby thread is picked up. When the roller 57 disengages the cam upon passing beyond idler 35, the spring 54 once again laterally advances sleeve 49 so as to pinch the thread tightly and hold it between the sidewall of the bottom portion of the slot 50 and the notch 53 of the shaft.

A suitable length of thread is carried under electrode bar 6 and positioned in groove 96 therein so that it can be bonded to the plastic sheeting.

The thread 12 is preferably placed in the groove 96 of the electrode bar by the action of the thread gripper members and is maintained taut and under tension while in groove 96 of the electrode bar. In this manner, the thread is in the correct position for bonding to the plastic sheeting 13 and cannot slip out of the groove 96 when the electrode bar begins the downward stroke of its cycle of moving toward and contacting the sheeting 13. The threads are also preferably under some tension as they are fused and welded to the plastic layer 14 of the sheeting 13, such tension being an advantage in the thread severing operation which takes place at each end of the electrode bar. When the electrode bar is in contact with the plastic sheet, the thread under each end of the bar is in a softened, thermoplastic condition. The portion of the thread adjacent the end of the bar is cooler, stronger, and, as noted, preferably under tension. The thread quickly yields in tension at each end of the bar, stretching and becoming smaller in diameter until it fails. Other means such as a severing knife may be used to cut off the thread, but the method described is preferable in that it is simple and gives a clean cut-off. The thread gripper members move a distance about equal to the distance of from one end of the base platen 4 to the other end each time the roller chains move. The thread grippers conduct the thread between the electrode bars and the base platen as the thread grippers themselves move between the electrode bars and base platen. When the movable plate is in the down position, the threads 12 that are held in the grooves in the electrode bars are welded to the plastic sheeting and actually burned off at the edges of the sheeting 13 with the result that small lengths of thread are held by the thread grippers as they move around the chain past the idlers 36. As the thread gripping members approach sprockets 37, as best seen in FIG. 3, the roller 57 contacts cam 65 which also acts against spring 54 and aligns the bottom portions of the slot 50 and the shaft notches 53 so that the very small lengths of thread are released and drop out of the way. The thread gripper continues on its path around sprocket 37 and comes to rest between sprockets 33 and 37, thereby completing one cycle.

The action of the thread gripper and other thread tension devices in which the gripper members pick up the threads near the idler sprockets 36 while traveling towards the platens, can be seen in FIG. 6. The thread itself is positioned and guided by an L-shaped member 68 having an opening 69 which in turn is held against a block 70 having a rounded, smooth toe portion 71 to snub the thread and prevent slack in the thread feed.

When the thread is picked up, the L-shaped member 68 is held against the toe 71 by the thread gripper which engages and rides on arm 72. This arm is rigidly connected to the L-shaped member 68 through a connecting member 75 and panel 76 which is hinged to the block member 70 by means of a hinge 77 with a pin 78. When the gripper member does not engage the arm member 72, the L-shaped member is free, swings away and disengages the toe 71. Thus, the tension is maintained on the thread generally by the thread grippers alone except when a gripper is picking up threads as previously described.

The thread gripper members are at rest when a length of thread is welded to the plastic sheeting and burned off by the same operation. One thread gripper is preferably engaging to an end portion 79 of the arm which is the end opposite the hinge 77. When a thread gripper is in this position of contact with the arm 72, as previously explained the maintenance of tension on the thread is aided by the toe 71 at the generally circular opening 69 in the L-shaped member 68. Another notch 80 in the member 68 also serves to align and help maintain tension on the thread.

A control means comprising a microswitch 81 is located in the path of the thread gripper members between sprockets 33 and 37 to keep the length of the conveyor chains substantially uniform each time the chains are moved. When a thread gripper member contacts a switch 81, the travel of the chain is halted as the motor 26 is stopped by cut-off of electric power and the action of an electric brake 82 which is de-energized when the motor is stopped.

The action of movable platen 5 carrying electrode bars 6 is coordinated with the action of the thread gripping members 19 as they intermittently travel their orbit about the press frame. The platen 5 is moved up and down by reciprocating press means comprising a hydraulic cylinder 85 and piston (not shown) and attached piston rod 86. As best seen in FIGS. 2 and 3, a plurality of piston rods 86 having U-shaped clevis portions 87 extend from the hydraulic fluid chamber thru stuffing boxes 88. The U-shaped end portions 87 of the pistons are connected to a plurality of ears 89 which are welded or otherwise rigidly attached to the upper platen 5. The electrode bars 6, which are preferably brass or other highly conductive material, thus are moved toward and away from the plastic sheeting 13.

The electrode bars are attached to the movable platen member 5 by an aluminum electrode base 90 and plate member 91. The total movement of the platen 5 and electrode bars 6 is about equal to the height of the electrode bar. In any event the total movement must be enough to permit passage of the thread grippers between the electrode bars and the plastic sheeting when the movable platen 5 is at the up-stroke position, i.e. when the electrode bar is separated from the plastic sheeting by the greatest distance. The down stroke positions of the electrode bars are shown in dot-dash lines in FIG. 3.

An enlarged cross-section of the electrode bar is shown in FIG. 9. The bar is made of brass, copper or other suitable material. It is substantially rectangular in cross-section with a U-shaped narrower bottom portion 95 in which a central groove 96 is formed. The groove has substantially square corners with the sides being slightly shorter than the bottom width. By way of example, the width of the groove may be .050″ and the depth or sides .020″. The lands 94 adjacent the groove are preferably rounded or provided with a radius on the outer corners as shown. While the thread is being bonded to the plastic sheet, the lands 94 form the narrow indentations 16 adjacent the thread as shown in FIG. 11.

The length of the electrode bar depends upon the particular installation and width of material being processed. The ends of the bar are preferably spread apart to receive and guide in the thread as it is positioned by the thread grippers.

The U-shaped ends 95 (FIG. 9) of the electrode bar touch and press into the plastic layer 14 of the plastic sheeting as well as press and weld the plastic thread into the plastic layer to produce the attractive quilt-like pattern as illustrated in FIG. 10. Before the welding heat is supplied through the electrode bar, the thread is held in a groove 96 formed by the lands 94 of the ends 95 of the electrode bar, and the thread may project beyond the lands 94 although the extent of the projection should not be so far that the thread is undesirably deformed and flattened during the welding step. The platen 5 is moved toward and away from base platen 4 by control means which may be a solenoid valve which is energized to let fluid in a fluid or hydraulic chamber 85 which forces the piston downward toward the base platen.

In further considering the action of the electrode bars it should be noted that the electrode bars actually reduce the thickness of plastic layer 14 by squeezing out some of the plastic material from under the points of contact as seen in FIG. 10 so that for best results a fibrous pad 97 is used to cushion the down stroke of the electrode bars. Also the aforementioned solenoid valve control means for starting and stopping the electrode bar movement may be energized by the tripping of a contact switch 98 which is accomplished during the plastic sheeting feed cycle. The means used for feeding the plastic sheeting will be discussed more fully hereafter.

Returning to the movement of the upper platen 5, there are contact switches 99 and 100 as best seen in FIG. 2 which are contacted by the moving platen through a contacting portion 101 at the up and down positions of the movable platen. On the down stroke, the contacting member 101 contacts a finger 102 of switch 99 which reverses the direction of travel of the platen 5 and which also may activate a time delay relay to turn off the dielectric heating means since the heat is not required except when the electrode bar is in contact with the plastic sheeting. On the up-stroke of the press, contacting member 101 trips a finger 103 of switch 100 which activates control means for starting the movement of the "roller" or link chains 18 and for starting the movement of plastic sheeting.

The plastic sheeting 13 is hiked along a predetermined length during each cycle of the press. The movement, of course, is timed to take place while the movable platen 5 is at the up position. The plastic sheeting, as best seen in FIGS. 1 and 2, may be fed by means comprising a rack and gear drive. A feed roll 107 conveys the sheeting along a fixed distance for each overall cycle of the press in which preferably a plurality of threads are bonded to the sheeting. Feed roll 107 is turned by gear 108 which in turn is driven by means of a rack 109, a pawl 110 and a 3-tooth ratchet wheel 111. The rack 109 is attached to a reciprocating piston 112 which may be driven up and down by a solenoid valve not shown which delivers compressed air or hydraulic fluid to a cylinder 115 in either one of the conduits 116 and 117. Putting air into the cylinder through conduit 116 will move the piston 112 down while delivering air to the cylinder through conduit 117 will drive the piston up in a direction towards the switch 98.

The movement of the plastic sheeting is coordinated with the movement of the thread gripper members and the movement of the electrode bars. Previously indicated, switch 100 is contacted on the up stroke of the press. Switch 100 activates a control means for moving the plastic sheeting comprising a solenoid valve which causes compressed air to flow into cylinder 115 through conduit 117. The piston is driven in a direction towards a switch 98, where it contacts finger 121 of the switch 120. The contact with switch 98 causes a reversal of the piston stroke by introducing compressed air into the cylinder by means of conduit 116. During the up stroke of the rack 109, the pawl 110 is engaged in one tooth of the ratchet wheel 111 so that the ratchet wheel and gear 108 rigidly connected thereto both move. The gear 18 thus moves one-third of the length of its circumference for each upstroke of the rack and piston. Any tendency towards tearing of the plastic sheeting by the relatively jerky action of the rack and gear drive may be minimized by a festoon of feed material as illustrated by the arrangement of rolls 124 and 125 which guide and conduct the sheeting to the press from a feed roll not shown.

As previously discussed, the delivery of heat from the dielectric heating means is timed so that heat will be available at the downstroke of the moving platen 5. The heating means is preferably turned off during the upstroke of the platen when there is no need for heat. As previously indicated, the high frequency generator 10, shown diagrammatically in FIG. 3, may be activated when switch 98 is contacted by rack 109. The generator may be turned on by the downstroke of the press when switch 99 is contacted, which in turn operates a time relay device to ensure a heat supply to the thread and sheeting until welded together.

One lead, which is the hot lead of the generator 10 is connected to the base platen 4 by means of an electrical conduit 127. The base platen 4 comprises a brass plate 128 and a layer of insulation 129 and a platen base member 130 as noted in FIG. 3 which is suitably grounded. The ground or cold line of the generator may be ground to the frame 1 of the press. The upper movable platen is also grounded to the frame 1 although a ground strap may be employed from the generator to the electrode bars 6 if desired.

It can be readily seen from the above description that, in order to bond a plurality of spaced plastic threads to plastic sheeting in an apparatus that continuously repeats the bonding cycle, it is necessary to coordinate three mechanical movements. As previously indicated the three movements that must be timed and coordinated once the apparatus is set in motion by a stop-start switch 131, are (1) the movement and action of the thread gripper members, (2) the movement and action of the electrode bars and (3) the movement of the plastic sheeting into and out of the press. The dielectric heating means is operated intermittently and is coordinated with the above movements to produce heat at the proper time in the overall cycle.

In order to effectively coordinate and make use of the various movements of the cooperating parts, a first control means is used to move the platen 6 toward and away from the fixed platen 5 in a continuous fixed cycle. A second control means is also employed to activate the high frequency generator when the electrode bars and plastic sheeting are in contact. A third control means is used to move the roller chains far enough so that the thread grippers bring up more plastic threads under the electrode bars and so the thread grippers clear the press. A fourth control means is used to move the plastic sheeting for a predetermined distance between the platens in a distance generally perpendicular to the travel of the plastic threads between the platens.

The bonding process has to be controlled and adjusted with care depending upon the materials involved, their thickness, the thread diameter, and other factors. The cycle has to be worked out so that the thread is softened and rendered thermoplastic but not melted or heated to lose shape and definition. A certain cooling off period must be allowed so that the electrode does not retain too much heat. If it does, it softens the thread and makes it difficult to handle.

As to the plastic sheeting itself, the resin used in the flexible plastic layer 14 preferably is a plasticized polyvinyl chloride, polyvinylidene chloride, polyvinyl chloride-vinyl acetate copolymers, vinylchloride-vinylidene chloride copolymers, and mixtures of the above.

The monofilaments or threads are preferably made of polyvinyl chloride or polyvinylidene chloride composition similar to that of the plastic layer of the backed sheeting. The threads may be made of other plastic materials also described as suitable sheeting materials providing the threads are thermoplastic, and bondable to the plastic layer of the sheeting. The plastic threads should be of a material that is easily welded to the sheeting when the diameter of the threads are in the range of 1 to 4 times the thickness of the plastic layers of the sheeting. While it is preferred that all plastic threads are used, plastic-coated fibers of cotton, rayon, nylon or the like may be used.

Examples of suitable fibrous backing materials are cotton fabric, rayon fabric, felt, paper, and a rayon fabric mixture with a high strength synthetic fiber such as nylon or polyethylene terepthalate. A suitable supporting material may be glass fibers, kraft paper, crepe paper, rubber saturated paper or flannels.

For the most efficient production and pleasing appearance, the spaced threads are preferably bonded in substantially parallel lines which lines also preferably have a length of about the same dimension as the width of the plastic sheeting. However, pleasing patterns of predetermined designs can also be formed when the lines are curved or wavy in shape.

It is to be understood that in accordance with the provisions of the patent statutes, the particular form of apparatus shown and described and the particular procedure set forth are presented for purposes of explanation and illustrations, and that various modifications of said apparatus and procedure can be made without departing from our invention.

Having described our invention, we claim:

1. An apparatus for bonding plastic threads to plastic sheeting to form simulated threads thereon comprising a press having a frame upon which is mounted a fixed platen and a movable platen, a plurality of spaced-apart, parallel electrode bars mounted on the movable platen, means for advancing plastic sheeting in regular increments over said fixed platen transversely of said electrode bars, dielectric heating means connected between said electrode bars and fixed platen, means to supply a plurality of aligned individual threads at one end of said press adjacent the ends of said electrode bars, each of said threads being aligned with an electrode bar, a pair of spaced-apart roller chains which move in a closed, controlled path beneath and to the sides of the movable platen and straddle the fixed platen, means to drive said roller chains, and a plurality of thread gripper members mounted on said roller chains which grip the individual threads provided by the thread supply means and position lengths thereof underneath said electrode bars prior to the bonding operation.

2. An apparatus for bonding plastic threads to plastic sheeting to form simulated threads thereon comprising a press having a frame upon which is mounted a fixed platen and a movable platen, a plurality of spaced-apart parallel electrode bars mounted on the movable platen, means for advancing plastic sheeting in regular increments over said fixed platen transversely of said electrode bars, dielectric heating means operative between said electrode bars and fixed platen, means to supply a plurality of aligned individual threads at one end of said press adjacent the ends of said electrode bars, each of said threads being aligned with an electrode bar, a pair of spaced-apart roller chains which move in a closed, controlled path beneath and to the sides of the movable platen and straddle the fixed platen, means to drive said roller chains, and at least one shaft which has a plurality of horizontally spaced, crosswise slots therein and at least one outer sleeve disposed over said shaft which has a plurality of horizontally spaced, crosswise slots therein mounted on said roller chains transversely of the electrode bars, means to momentarily align the slots of said shaft and sleeve to permit threads to be deposited in said slots, and means to displace the outer sleeve with respect to the shaft so that the threads are gripped between the edges of the slot in the outer sleeve and the slot in the shaft.

3. An apparatus for bonding plastic threads to plastic sheeting to form simulated threads thereon comprising a press having a frame upon which is mounted a fixed platen and a movable platen, a plurality of spaced-apart parallel electrode bars mounted on the movable platen, means for advacing plastic sheeting in regular increments over said fixed platen transversely of said electrode bars, dielectric heating means operative between said electrode bars and said fixed platen, means to supply a plurality of individual threads at one end of said press, each of which is aligned with an electrode bar, a pair of spaced-apart roller chains disposed on sprockets mounted on said frame which define a closed path beneath and to the sides of the movable platen and straddles the fixed platen, a plurality of thread gripper members mounted on said roller chains and equidistantly spaced from each other, said thread gripper members each comprising a shaft transversely disposed between said chains with a plurality of horizontally spaced, crosswise slots therein which are aligned with the ends of said electrode bars, mounting brackets at each end of said shaft on which said shaft is mounted and which are in turn mounted on said roller chain, a sleeve disposed over said shaft which has a plurality of horizontally spaced, crosswise slots therein which correspond to the slots in the shaft but are offset therefrom, means to momentarily align the slots of said sleeve with the slots of said shaft so as to receive a plastic thread therein, means to displace said outer shaft with respect to said inner shaft so as to grip and pinch threads disposed in the slots of said shaft and sleeve between the edges of the slot in the outer sleeve and the slot in the shaft, guide means for the mounting brackets of the shaft which are adapted to accurately position the thread gripper members beneath the electrode bars, and means to drive said roller chains in correlation with the reciprocation of the press and advancement of plastic sheeting over the fixed platen.

4. A method of bonding plastic thread to plastic sheeting comprising the steps of disposing a length of plastic thread under tension in the slot of an electrode bar, gripping and holding each end of the thread adjacent the ends of the electrode bar, pressing the electrode bar with the thread therein against said plastic sheeting, activating the dielectric field to heat said thread and electrode bar, and permitting the tension in said thread to pull itself apart during the bonding operation at the heated portion of each end of the electrode bar.

References Cited in the file of this patent

UNITED STATES PATENTS

| | | |
|---|---|---|
| 2,493,515 | Werner et al. | Jan. 3, 1950 |
| 2,620,015 | Stevenson et al. | Dec. 2, 1952 |
| 2,688,345 | Werner et al. | Sept. 7, 1954 |

FOREIGN PATENTS

| | | |
|---|---|---|
| 1,112,515 | France | Nov. 16, 1955 |